United States Patent [19]

Schneider

[11] Patent Number: 4,547,647
[45] Date of Patent: Oct. 15, 1985

[54] PROCESS AND MECHANISM FOR THREADING THE ELECTRODE WIRE OF AN EDM APPARATUS

[75] Inventor: Rudolf Schneider, Argovie, Switzerland

[73] Assignee: Ateliers des Charmilles, S.A., Geneve, Switzerland

[21] Appl. No.: 685,340

[22] Filed: Dec. 24, 1984

Related U.S. Application Data

[63] Continuation of Ser. No. 512,936, Jul. 12, 1983, abandoned, which is a continuation-in-part of Ser. No. 246,072, Mar. 20, 1981, abandoned.

[51] Int. Cl.[4] .................................................. B23P 1/08
[52] U.S. Cl. ................................. 219/69 W; 219/69 M
[58] Field of Search ............... 219/69 W, 69 M, 69 R, 219/69 D, 69 E

[56] References Cited

U.S. PATENT DOCUMENTS 3,891,819  6/1975  Ullmann et al. ................. 219/69 W

FOREIGN PATENT DOCUMENTS 2440564  8/1974  Fed. Rep. of Germany ... 219/69 W
0010130  2/1976  Japan ................................ 219/69 W
0141490  11/1979  Japan ................................ 219/69 W
0524658  10/1976  U.S.S.R. ........................... 219/69 W Primary Examiner—M. H. Paschall
Attorney, Agent, or Firm—Hauke and Patalidis

[57] ABSTRACT

A method and apparatus for threading the electrode wire of a travelling wire EDM apparatus through an aperture in a workpiece. Prior to threading the wire through the aperture in the workpiece, the wire is continuously annealed and straightened and is passed through a nozzle to which fluid under pressure is supplied for forming a jet stream at the outlet of the nozzle. Prior to a threading or rethreading operation the wire, which is continuously fed by pulling by a wire conveyor mechanism, is cut off proximate to the outlet of the nozzle. The jet stream is aimed at the aperture in the workpiece and the end of the wire is fed through the aperture, while being maintained coaxially by the jet stream. The consecutive steps for feeding the end of the wire through the aperture in the workpiece are effected in sequence for first threading the wire through a pre-drilled starting hole in the workpiece or for rethreading the wire through a cut in the workpiece after accidental rupture of the wire during a cutting operation.

3 Claims, 3 Drawing Figures

PROCESS AND MECHANISM FOR THREADING THE ELECTRODE WIRE OF AN EDM APPARATUS

CROSS REFERECE TO RELATED APPLICATIONS

The present application is a continuation of application Ser. No. 512,936, filed July 12, 1983, which is a continuation-in-part of application Ser. No. 246,072, filed Mar. 20, 1981, now abandoned.

BACKGROUND OF THE INVENTION

The present invention relates generally to a process and mechanism for threading an electrode wire through an aperture in an electrode workpiece in an electrical discharge machining apparatus of the type generally referred to as a travelling wire EDM apparatus, and more particularly to an electrode wire threading method and mechanism wherein the end of the electrode wire is introduced into a jet stream of fluid directed towards the aperture in the workpiece, in order to be guided by the jet stream of fluid through the aperture.

Diverse arrangements have been proposed in the past for automatically threading the electrode wire of a travelling wire EDM apparatus through a hole or aperture pre-drilled in the workpiece. For example, U.S. Pat. No. 3,987,270 and published Japanese application No. 15897/76 disclose such devices. Practical embodiments of the devices disclosed in one or the other of those publications are very difficult to accomplish, if not impossible, because guiding the wire by a stream of liquid is not sufficient to repeatedly bring the end of the wire directly opposite the aperture in the workpiece.

The present invention overcomes such difficulties and achieves, repetitively, automatic threading of an electrode wire through an aperture in a workpiece.

SUMMARY OF THE INVENTION

The method and apparatus of the invention are characterized in that the electrode wire is annealed and straightened prior to introducing the end of the wire in the jet stream of fluid, and the speed of displacement of the wire within the jet stream of fluid is effectively controlled.

The many advantages and objects of the present invention will be apparent to those skilled in the art when the following description of the best mode contemplated for practicing the invention is read in conjunction with the attached drawing showing schematically, and for illustrative purpose only, a structure for practicing the method of the invention. In the drawings:

DETAILED DESCRIPTION OF THE PREFERRED EMBODIMENT

Figure 1:
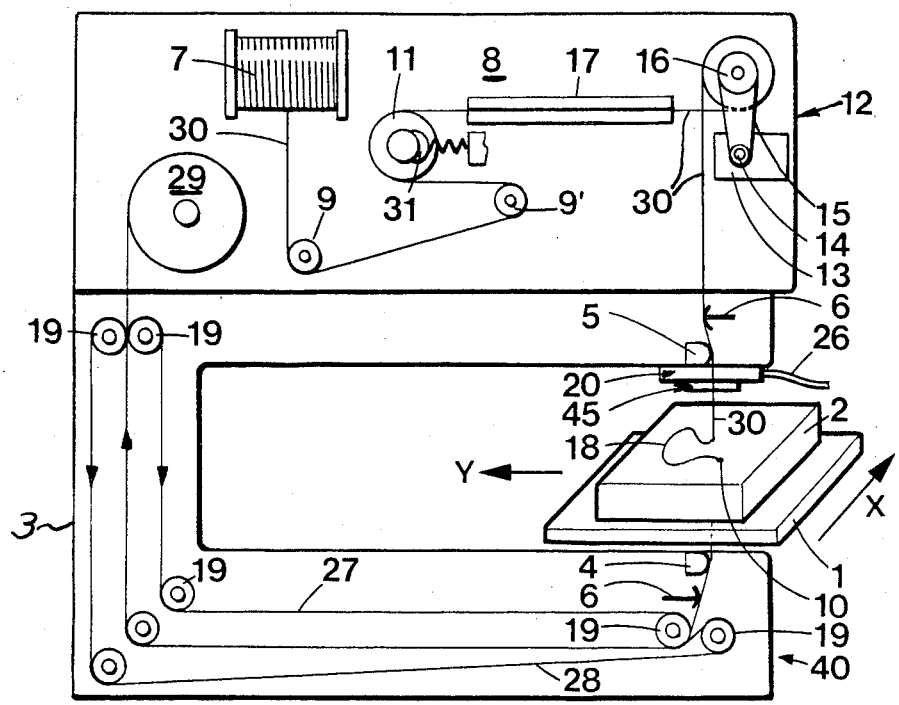
FIG. 1 is a schematic vertical section through a travelling wire EDM apparatus illustrating the arrangement of elements for feeding an electrode wire through a workpiece.

Referring to FIG. 1 of the drawing, a travelling wire EDM apparatus comprises a support table 1 for a workpiece 2 on which a cut is to be effected, the support table being movable horizontally along the X- and Y-axes according to an appropriate program for effecting a cut 18 in the workpiece 2 along a predetermined path by means not shown, but well known in the travelling wire EDM technology. A generally U-shaped frame member 3 supports a pair of guide members 4 and 5 for causing an electrode wire 30 to assume a predetermined rectilinear shape. The electrode wire 30 is unwound from a supply spool 7 mounted on a plate 8 affixed to the top of the frame 3. The wire 30, after unwinding from the supply spool 7, is passed over a series of rollers 9, 9' and 11 prior to being passed through an enclosure 17 forming a heating zone for the travelling wire 30. Heating of the wire may be achieved by any convenient means, for example by passing an electrical current through the wire 30.

After exiting from the heating zone enclosure 17, the wire 30, still at a temperature higher than ambient, is introduced into a feeding mechanism 12. The feeding mechanism 12 comprises a motor 13 which, through a gear associated with a one-way drive free-wheeling clutch mechanism 14, well known in the art and not shown in detail, and by means of a belt drive 15, drives in rotation a feed drum 16 provided with a guiding groove for the wire 30. The feed drum 16 is further provided with an adjustable brake mechanism, well known in the art, which is not shown in detail and which ensures that the wire 30 is under tension during normal operation, the adjustable brake mechanism opposing the pulling action of the wire transport mechanism 40.

Prior to reaching the wire transport mechanism 40, the wire 30 travels against one or two sliding contacts 6 connected to one of the terminals of a pulse power generator, not shown, providing voltage pulses across the wire 30 and workpiece 2 for triggering machining current pulses therebetween, for cutting the workpiece 2 according to an appropriate path 18. The sliding contacts are generally made of tungsten, while the wire guide members 4 and 5 are made of sapphire.

After passing over the guide member 5, the wire 30, still at a temperature higher than ambient, passes through a nozzle 20 supplied in pressurized fluid by a conduit 26, the fluid being preferably the same fluid as the dielectric and cooling liquid used in the EDM apparatus. The wire 30 is thus rapidly cooled by the fluid to a lower temperature corresponding to an equilibrium temperature between the temperature of the fluid and the temperature of the wire prior to introduction into the fluid, some heat being supplied to the wire 30 as a result of the passage of machining current supplied to the wire at the sliding contacts 6. The nozzle 20 is described in further detail with reference to FIG. 2. A wire cutting mechanism 45, described in further detail with respect to FIG. 3, is mounted below the nozzle 20.

The wire transport mechanism 40 comprises a pair of endless belts 27 and 28, travelling in the same direction where in mutual engagement, and supported by a plurality of rollers 19. The belts form an arrangement for grabbing the end of the wire 30 after passage through the workpiece 2, and for transporting the wire to a receiving spool 29. The endless belts 27 and 28 are driven by a motor, which is not shown as such an arrangement is also well known with regard to travelling wire EDM apparatus.

Prior to starting a cut on the workpiece 2, the workpiece is provided with a drilled hole or aperture 10 for threading the electrode wire 30 therethrough. Prior to threading the electrode wire 30 through the pre-drilled hole 10, the end of the wire is cut off by the wire cut-off mechanism 45, and the wire 30 is fed towards the pre-drilled hole 10, while being guided by a jet stream 34, FIG. 2, of fluid provided by the nozzle 20.

Figure 2:
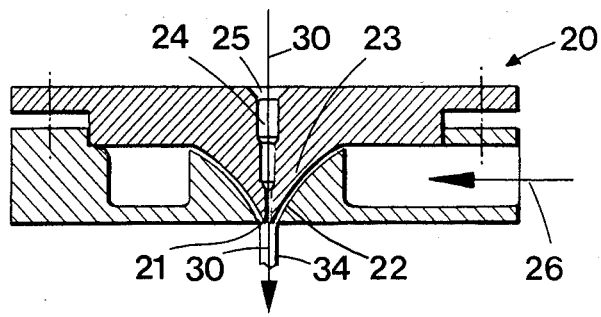
FIG. 2 is a section through a nozzle for obtaining a fluid jet stream, forming part of the apparatus illustrated at FIG. 1.
Figure 3:
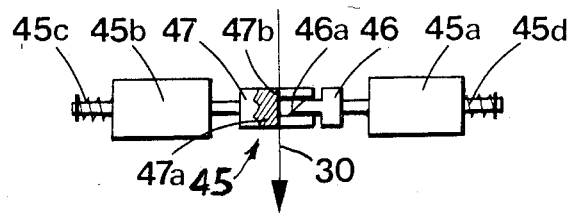
FIG. 3 is a schematic representation of a wire cutting mechanism, which also forms part of the apparatus of FIG. 1.

As shown in detail at FIG. 2, the nozzle 20 presents a straight line passage of the wire 30 therethrough, the outlet of the nozzle being directed towards the hole or aperture 10. The nozzle has an annular channel 22 generally shaped as a funnel, and a centrally disposed generally conical portion 23, the shape and dimension of the funnel-shaped annular channel 22 and of the conical portion 23 being such as to provide a non-turbulent steady laminar flow of fluid. The result is that a non-turbulent jet stream 34 of fluid is achieved at the outlet 21 of the nozzle 20, the jet stream being clearly delineated and capable of carrying or propelling the electrode wire 30, as a result of surface friction exerted on the wire which is thus propelled by the jet stream of fluid much more slowly than the jet stream. A wire guiding channelway 24, having a frusto-conical inlet 25 and a progressively reduced diameter, is disposed through the conical member 23. However, the channelway 24 has a cross section of greater diameter than the wire 30 at the nozzle outlet 21, such that the wire does not touch the wall of the channelway, and is guided coaxially thereto. The channelway 24 has, therefore, a guiding function solely in the event that the end of the wire is slightly displaced laterally when first introduced through the nozzle 20.

The wire cut-off mechanism 45, FIG. 3, comprises a pair of cutting members 46 and 47 reciprocable towards each other from a dwell position to an operating position, and a guiding member 47b which is located in alignment with the axis of normal longitudinal feed of the wire 30, while the edge of the cut-off knife 46 mounted on the end of the cutting member 46 is subject to a very short stroke, and therefore cuts off the end of the wire in co-operation with the knife back-up member 47a, very neatly and practically without bending over the cut-off end of the wire. The cutting members 46 and 47 are displaced towards each other in synchronism, by means of hydraulic motors 45a and 45b, consisting each of a cylinder and piston assembly. The cutting members 46 and 47 are returned to their dwell position by return springs 45c and 45d.

The apparatus of the invention functions as follows:

Original threading of the electrode wire 30 through the starting aperture 10 in the workpiece 2 may of course be effected manually if so desired, the outlet 21 of the nozzle 20 being located above and concentric with the starting hole 10 in the workpiece. The wire transport mechanism or conveyor 40 is started and the end of the wire is manually pushed through the starting hole 10 in the workpiece 2 until the end of the wire is grasped by the wire transport mechanism of conveyor 40.

The invention, however, permits to effectuate automatic threading of the electrode wire 30 through the workpiece by first displacing the table 1 supporting the workpiece 2 to a position enabling the electrode wire 30 to run outside of the area of the workpiece, the wire being heated and annealed in the heating zone 17, and being held under tension between the drum 16, which is free-wheeling, and the wire transport mechanism or conveyor 40. Fluid is supplied to the nozzle 20, and the cut-off mechanism 45 is actuated for cutting of the wire. As the motion of the wire is due entirely to the pull exerted by the wire transport mechanism or conveyor 40, as soon as the wire 30 is cut off by the wire cut-off mechanism 45 the motion of the wire 30 above the wire cut-off mechanism 45 is immediately stopped such that the end of the cut off wire remains straight. The table 1 is subsequently positioned to appropriate coordinates along the X- and Y-axes such that the pre-drilled threading aperture 10 through the workpiece 2 is aligned with the axis of the nozzle 20, as machining fluid is supplied at high pressure to the nozzle 20 through the conduit 26, the pressure being about 10 bars or more. Simultaneously, the motor 13 is started, which propels the wire 30 at a predetermined velocity, much lower than the velocity of the jet stream 34 of fluid. Because the wire 30, which is generally made of copper or brass, has been annealed in the heating enclosure 17 and has lost its initial stiffness, and has been straightened under tension between the drum 16 and the wire transport mechanism or conveyor 40, the end of the wire is held substantially centered in the jet stream 34 by the hydrodynamic forces applied on the wire. The jet stream 34 being aimed towards the pre-drilled aperture 10, the end of the wire is brought to the inlet of the aperture and is pushed through the aperture 10 without any difficulty, being fed through the aperture by the drum 16. After having been passed through the aperture 10 through the workpiece 2, the end of the wire abuts against the wire conveyor belt 28 and is grabbed between the belts 27 and 28 of the conveyor 40. The speed of the belts 27 and 28 being higher than the peripheral velocity of the feed drum 16, driven by the motor 13, the feed drum 16 is pulled at a higher speed by the wire 30, due to the free-wheeling drive of the drum, and the pull on the wire is determined by the action of the brake 14 tending to slow down the drum 16. While effecting a cut in the workpiece 2, the jet stream 34 of fluid is maintained through the nozzle 20 to flush the machining zone.

At the end of a cutting operation having been effected in the workpiece 2, the motor 13 is shut off and the electrode wire 30 is cut off by the cut-off mechanism 45, the wire transport mechanism or conveyor 40 being in operation for a short period of time. The machine operator can then remove the workpiece 2 and replace it by a blank workpiece, or reset the work in the event that several independent cuts must be effected on the same workpiece. Alternatively, when several independent cuts must be effected on the same workpiece and several predrilled threading aperture 10 are disposed through the workpiece, consecutive realignment of each of a plurality of predrilled threading apertures 10 with the axis of the nozzle 20 may be effected according to a predetermined program, without intervention by the machine operator, and the automatic threading of the electrode wire 30 through the aligned threading aperture may be effected automatically, as previously described.

During a normal cutting operation, the motor 13 is normally stopped such that the drum 16 is free-wheeling, the pull on the wire being determined solely by the action of the brake 14 tending to slow down the rotation of the drum 16.

In the event of accidental rupture of the electrode wire 30 during a cutting operation, which normally occurs in the machining zone, further longitudinal feed of the wire is immediately stopped as the used portion of the wire 30 is evacuated by the wire transport mechanism or conveyor 40. The portion of the wire 30 projecting beyond the nozzle 20 is automatically cut off by the wire cut-off mechanism 45, and the motor 13 driving the feed drum 16 is restarted such as to automatically thread the end of the wire 30 through the cut 18 in the workpiece 2, the end of the wire being constantly held concentric to the nozzle outlet 21 by the jetstream 34 of fluid. It is to be noted that because the wire 30 has been annealed in the heating zone 17 and was held under constant tension between the feed drum 16 and the wire transport mechanism or conveyor 40 prior to rupture, the wire is substantially straight and automatic rethreading through the cut in the workpiece may be effected without difficulty. Alternatively, the control of the motion of the table 1 along the X- and Y-axes may be programmed such as to reposition the pre-drilled starting aperture 10 in the workpiece 2 directly below, and in alignment with, the outlet 21 of the nozzle 20 such as to rethread the wire through the starting pre-drilled aperture and run the whole course of the path 18 without effecting a cut in the workpiece 2 until reaching the portion of the cut where rupture occurred, and then restarting the electrical discharges through the machining zone.

It is to be noted that the tension or pull exerted on the wire 30 upstream of the feed drum 16 within the heating enclosure 17 is determined by a brake 31 acting upon a roller 11. The pull on the wire 30 within the heating enclosure 17 is much less than the pull between the feed drum 16 and the wire conveyor 40, i.e. the pull exerted on the wire 30 within the machining zone.

Annealing the wire 30 prior to introducing it into the jet stream of fluid presents many advantages because the wire has become very soft and can be accurately aimed towards the threading aperture 10 by a jet stream of fluid having a relatively low pressure, in the order of 1 to 2 bars. However, by using a fluid under high pressure, for example of at least 5 bars and in the order of 10 bars to multiples of 10 bars, the guiding effect of the jet stream on the wire is increased such that the wire end could be easily guided without a prior anneal operation on the wire.

Nevertheless, it is advantageous to straighten the wire before introducing its end into the jet stream. Straightening of the wire can be effected without annealing simply by cold drawing, although hot drawing at a temperature relatively high, for example of the order of 500° to 600° C. for a brass wire, permits to achieve good results more easily.

It will be appreciated that in the example of structure illustrated and described, two consecutive draws of the wire are effected, namely a first draw through the heating enclosure 17 with a relatively low pull as caused by the action of the brake 31 and a second draw which is effected under a stronger pull between the feed drum 16 and the wire conveyor 40, the second draw being effected after a partial cooling of the wire, i.e. at a temperature lower than the wire temperature through the heating enclosure 17 but higher than the ambient temperature.

Having thus described the present invention by way of an example of structure well designed to practice the invention, what is claimed is as follows:

1. A method for threading and rethreading the electrode wire of a travelling wire EDM apparatus through an aperture in a workpiece, said method comprising feeding said wire from a supply spool to a braked roller, feeding said wire from said braked roller to a motor driven feed drum, heating said wire to a first temperature between said braked roller and said first drum for annealing said wire, simultaneously effecting a first longitudinal pull on said wire by means of said feed drum while being heated at said first temperature and being tensioned between said braked roller and said feed drum, allowing said wire to cool to a second temperature lower than said first temperature and higher than ambient temperature, effecting a second longitudinal pull on said wire while at said second temperature for straightening said wire, passing said wire through a passageway in a stationary nozzle, said stationary nozzle being supplied with fluid for forming a jet stream of fluid maintaining said wire substantially coaxially in said nozzle passageway and in said jet stream of fluid, engaging said wire after passage through said nozzle passageway in a wire conveying mechanism whereby said wire conveying mechanism effects said second longitudinal pull on said wire at said second temperature between said feed drum and said wire conveying mechanism by over-running said feed drum by said wire conveying mechanism, cutting off said wire at a portion thereof downstream of said nozzle and proximate to said nozzle while simultaneously stopping said feed drum, aiming said jet stream of fluid to said aperture in the workpiece, restarting said feed drum for feeding the end of said wire through said aperture while being guided by said jet stream of fluid aimed at said aperture, and engaging the end of said wire after passage through said aperture with said wire conveying mechanism for re-establishing said second longitudinal pull on said wire at said second temperature.

2. The method of claim 1 wherein said fluid supplied to said nozzle is at a pressure of at least 5 bars.

3. A travelling wire EDM apparatus comprising a wire supply spool, a braked roller around which an electrode wire supplied from said supply spool is wound, a motor driven feed drum around which said wire is wound, a heating zone disposed between said braked roller and said feed drum for heating said wire to a first temperature for annealing said wire while simultaneously effecting a first longitudinal pull on said wire by means of said motor driven feed drum, a nozzle having a passageway for passage therethrough of said wire, said nozzle having means supplying fluid to said passageway for forming a jet stream of fluid maintaining said wire substantially coaxially in said nozzle passageway, a wire cut-off mechanism disposed downstream of said nozzle, a cross-slide table for supporting a workpiece, and a wire conveying mechanism engageable by said wire after passage through said nozzle for feeding said wire longitudinally relative to said workpiece disposed on said table by effecting a pull on said wire beyond said feed drum, whereby said wire is subjected to a first traction pull between said braked roller and said feed drum while being heated in said heating zone and to a second pull between said feed drum and said wire conveying mechanism, and wherein said wire is threaded through an aperture in said workpiece after cutting said wire with said wire cut-off mechanism and feeding said wire by said feed drum while maintaining said wire coaxially in a stream of said fluid, said nozzle being aimed at said aperture in the workpiece.

* * * * *

UNITED STATES PATENT AND TRADEMARK OFFICE
CERTIFICATE OF CORRECTION

PATENT NO. : 4,547,647
DATED     : October 15, 1985
INVENTOR(S) : Rudolf Schneider It is certified that error appears in the above–identified patent and that said Letters Patent are hereby corrected as shown below:

Col. 3, line 42, after "edge", insert --46a--

Col. 4, line 55, change "aperture" to --apertures--

Col. 6, line 7, change "first" to --feed--

Signed and Sealed this

Twenty-first Day of January 1986

[SEAL]

Attest:

DONALD J. QUIGG

Attesting Officer

Commissioner of Patents and Trademarks